(12) United States Patent
Hague et al.

(10) Patent No.: US 11,722,393 B2
(45) Date of Patent: Aug. 8, 2023

(54) SYSTEMS AND METHODS FOR MANAGING ON-SITE COMMUNICATIONS FOR LATENCY-DEPENDENT APPLICATIONS

(71) Applicant: Caterpillar Inc., Peoria, IL (US)

(72) Inventors: Michael Evan Hague, Washington, IL (US); Aaron R. Shatters, Peoria, IL (US); Michael Anthony Spielman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 17/123,044

(22) Filed: Dec. 15, 2020

(65) Prior Publication Data

US 2022/0191118 A1 Jun. 16, 2022

(51) Int. Cl.
*H04L 43/0852* (2022.01)
*H04L 41/02* (2022.01)
*H04L 41/5009* (2022.01)
*H04L 43/16* (2022.01)

(52) U.S. Cl.
CPC .......... *H04L 43/0852* (2013.01); *H04L 41/02* (2013.01); *H04L 41/5009* (2013.01); *H04L 43/16* (2013.01)

(58) Field of Classification Search
CPC ..... H04L 43/0852; H04L 43/16; H04L 41/02; H04L 41/5009
USPC .................................. 709/223, 224; 370/235
See application file for complete search history.

(56) References Cited

U.S. PATENT DOCUMENTS

| | | | |
|---|---|---|---|
| 6,856,879 B2 | 2/2005 | Arakawa et al. | |
| 6,993,246 B1* | 1/2006 | Pan | H04L 67/12 |
| | | | 386/239 |
| 7,149,530 B1 | 12/2006 | Arakawa et al. | |
| 7,162,347 B2 | 1/2007 | Shibamori et al. | |
| 7,283,810 B1 | 10/2007 | Arakawa et al. | |
| 9,554,134 B2* | 1/2017 | Sermadevi | H04N 19/42 |
| 9,727,522 B1* | 8/2017 | Barber | G06F 9/5016 |

(Continued)

FOREIGN PATENT DOCUMENTS

| | | |
|---|---|---|
| CN | 106530144 A | 3/2017 |
| CN | 111319656 A | 6/2020 |

OTHER PUBLICATIONS

Written Opinion and International Search Report for Int'l Patent Application, PCT/US2021/062297, dated Mar. 2, 2022, (15 pages).

*Primary Examiner* — Thu Ha T Nguyen
(74) *Attorney, Agent, or Firm* — Perkins Coie

(57) ABSTRACT

The present disclosure is directed to systems and methods for managing on-site communications of a machine with a latency-dependent application installed. The method includes, for example, (i) receiving geographical information associated with a work site; (ii) receiving historical communications information associated with the work site; (iii) analyzing the historical communications information and the geographical information; (iv) generating an instruction for implementing the latency-dependent application of the machine based on a latency requirement of the latency-dependent application; and (v) implementing the latency-dependent application of the machine based on the instruction. The historical communications information includes a communications event, a duration of the communications event, and a frequency of the communications event.

20 Claims, 6 Drawing Sheets

(56) References Cited

U.S. PATENT DOCUMENTS

| | | | | |
|---|---|---|---|---|
| 10,812,992 B1* | 10/2020 | Tran | | H04W 16/28 |
| 10,944,641 B1* | 3/2021 | Zacks | | H04L 41/5067 |
| 11,159,958 B1* | 10/2021 | Hatamian | | H04W 4/38 |
| 11,172,542 B1* | 11/2021 | Kalkunte | | H04W 4/44 |
| 11,191,013 B1* | 11/2021 | Kalkunte | | H04W 64/003 |
| 11,601,837 B1* | 3/2023 | Marupaduga | | H04L 43/0852 |
| 2002/0077787 A1* | 6/2002 | Rappaport | | H04L 41/12 |
| | | | | 702/188 |
| 2003/0177183 A1* | 9/2003 | Cabrera | | H04L 29/06 |
| | | | | 709/224 |
| 2009/0046573 A1* | 2/2009 | Damnjanovic | | H04J 11/0093 |
| | | | | 370/216 |
| 2009/0322510 A1* | 12/2009 | Berger | | H04W 60/00 |
| | | | | 340/568.1 |
| 2010/0120394 A1* | 5/2010 | Mia | | H04W 64/003 |
| | | | | 455/436 |
| 2013/0065585 A1* | 3/2013 | Pelletier | | H04W 4/023 |
| | | | | 455/456.6 |
| 2014/0031064 A1 | 1/2014 | Shaffer | | |
| 2014/0233472 A1* | 8/2014 | Kadel | | H04W 24/02 |
| | | | | 370/329 |
| 2017/0006141 A1* | 1/2017 | Bhadra | | H04W 4/70 |
| 2017/0164257 A1 | 6/2017 | Ross | | |
| 2018/0216459 A1 | 8/2018 | Heikkila et al. | | |
| 2018/0287696 A1* | 10/2018 | Barbieri | | H04W 36/08 |
| 2018/0317067 A1* | 11/2018 | Ameixieira | | H04W 4/50 |
| 2018/0368010 A1* | 12/2018 | Mitchell | | H04L 41/0645 |
| 2019/0099653 A1* | 4/2019 | Wanke | | G06Q 50/01 |
| 2019/0174344 A1* | 6/2019 | Karelia | | H04L 43/062 |
| 2019/0209022 A1* | 7/2019 | Sobol | | A61B 5/6804 |
| 2019/0222652 A1* | 7/2019 | Graefe | | H04W 84/18 |
| 2019/0230186 A1* | 7/2019 | Yellin | | H04L 67/5683 |
| 2019/0308099 A1* | 10/2019 | Lalonde | | A63F 13/355 |
| 2019/0320494 A1* | 10/2019 | Jayawardene | | H04W 36/08 |
| 2020/0043348 A1* | 2/2020 | Ghosh | | G01C 21/005 |
| 2020/0204978 A1* | 6/2020 | Birrane, III | | H04W 36/32 |
| 2020/0238175 A1* | 7/2020 | Smullen | | A63F 13/53 |
| 2020/0344847 A1* | 10/2020 | Nardini | | H04W 4/00 |
| 2021/0006642 A1* | 1/2021 | He | | H04L 43/0817 |
| 2021/0037107 A1* | 2/2021 | Klenk | | H04L 12/1886 |
| 2021/0070285 A1* | 3/2021 | Zuo | | B60W 30/0953 |
| 2021/0144517 A1* | 5/2021 | Guim Bernat | | G06F 9/4881 |
| 2021/0144790 A1* | 5/2021 | Faccin | | H04W 60/00 |
| 2021/0218551 A1* | 7/2021 | Moriarty | | H04L 63/20 |
| 2021/0314892 A1* | 10/2021 | Rico Alvarino | | H04W 72/23 |
| 2021/0320981 A1* | 10/2021 | Elbert | | H04L 67/306 |
| 2021/0329089 A1* | 10/2021 | Yellin | | H04L 67/10 |
| 2021/0329091 A1* | 10/2021 | Yellin | | H04L 67/5681 |
| 2021/0360070 A1* | 11/2021 | Celia | | H04L 67/565 |
| 2022/0026920 A1* | 1/2022 | Ebrahimi Afrouzi | | G06N 3/045 |
| 2022/0052753 A1* | 2/2022 | Speidel | | H04B 7/18513 |
| 2022/0053302 A1* | 2/2022 | Vassilovski | | H04L 67/5681 |
| 2022/0060957 A1* | 2/2022 | Shuman | | H04W 48/02 |
| 2022/0070272 A1* | 3/2022 | Vasiliauskas | | H04L 67/2866 |
| 2022/0138988 A1* | 5/2022 | Stengel | | G06T 9/00 |
| | | | | 345/426 |
| 2022/0173799 A1* | 6/2022 | Wigard | | G01S 19/29 |
| 2022/0187841 A1* | 6/2022 | Ebrahimi Afrouzi | | |
| | | | | G05D 1/0242 |
| 2022/0318828 A1* | 10/2022 | Hsu | | G06Q 30/0201 |
| 2022/0400532 A1* | 12/2022 | Kalkunte | | H04W 72/21 |
| 2023/0035010 A1* | 2/2023 | Kalkunte | | H04B 17/373 |
| 2023/0071954 A1* | 3/2023 | Kalkunte | | H04W 72/21 |

* cited by examiner

SYSTEMS AND METHODS FOR MANAGING ON-SITE COMMUNICATIONS FOR LATENCY-DEPENDENT APPLICATIONS

TECHNICAL FIELD

The present technology is directed to systems and methods for managing on-site communications. More particularly, systems and methods for managing on-site communications for latency-dependent applications installed in one or more machines, devices, or vehicles are disclosed herein.

BACKGROUND

To communicate and manage on-site machines, the quality and speed of communications are crucial. "Real-time" or "low-latency" communications enables an operator or a server to monitor the statuses of the on-site machines so as to make sure that their assigned tasks are performed in a timely manner. U.S. Patent Publication No. 2018/0216459 (HEIKKILA) discloses a method for determining positional conditions of a satellite-positioned mobile mining machine. More particularly, HEIKKILA discloses scheduling mine work tasks based on predicted future satellite coverage. HEIKKILA "determine[s] satellite coverage condition data, take[s] the data into account, and modif[ies] instant of time of execution of one or more mine work tasks . . . [such that] poor satellite coverage situations and other problems in satellite positioning can be avoided beforehand." (HEIKKILA, paragraph [0009].) However, not every on-site tasks can enjoy the luxury of rescheduling due to time and budget restraints. Therefore, it is advantageous to have an improved method and system to address this issue.

BRIEF DESCRIPTION OF THE DRAWINGS

Non-limiting and non-exhaustive examples are described with reference to the following figures.

DETAILED DESCRIPTION

Figure 1:
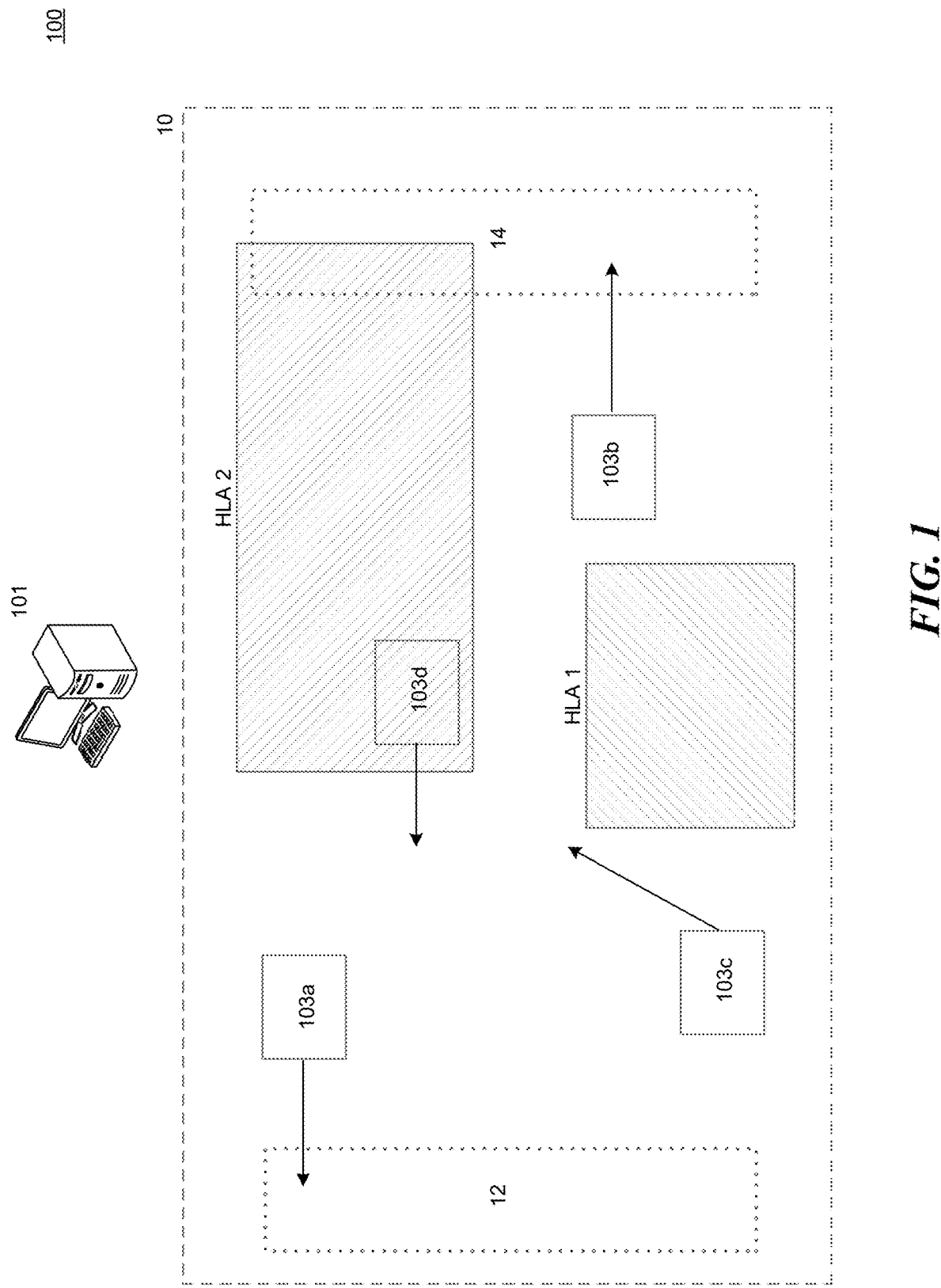
FIG. 1 is a schematic diagram illustrating a system in accordance with embodiments of the present technology.

Various aspects of the disclosure are described more fully below with reference to the accompanying drawings, which form a part hereof, and which show specific exemplary aspects. Different aspects of the disclosure may be implemented in many different forms and should not be construed as limited to the aspects set forth herein. Rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation, or an implementation combining software and hardware aspects. The following detailed description is, therefore, not to be taken in a limiting sense.

The present technology is directed to systems and methods for managing on-site communications of one or more machines, devices, and/or vehicles with one or more "latency-dependent" applications installed thereon. Implementing these latency-dependent applications on-site requires a high quality of communications because such applications are configured to implement time-sensitive tasks. Therefore, communicating with a server or an operator in a real-time or low-latency manner is preferred.

For example, the present system can be used to manage and control multiple machines to moving materials around in a work site (e.g., a mining site, a construction site, etc.). These machines have a "dynamic" task-analysis application installed thereon, so as to determine the "specifics" of a task assigned to each machine. The "specifics" of the task can include, for example, when and where to pick up or unload materials (e.g., mining/construction materials), weights and volumes of the materials, optimal and/or alternative routes, road or weather conditions of the routes, etc. Since some factors to determine the specifics can be "dynamic" or change with time, to efficiently implement the task-analysis application of the machines, the machines may need to communicate with a server (or an operator) in a real-time or low-latency manner such that the server can efficiently coordinate the tasks among the machines.

To address this need, the present method provides a solution by analyzing historical communications information associated with a work site. In some embodiments, the historical communications information includes a communications event (e.g., an interruption, loss of signal, intermittent transmission, etc.), a duration of the communications event (e.g., seconds), and a frequency of the communications event (e.g., how often the event has been happened in a past time period). Based on the result of the analysis and latency requirements of the latency-dependent applications, the present method can determine whether and/or how to implement the latency-dependent applications in the work site, and accordingly generate instructions for the machines, devices, and/or vehicles in the work site to follow.

For example, in some embodiments, a latency requirement of a latency-dependent application can be "less than 30 seconds." In such embodiments, the present technology can determine, based on the historical communications information, how to implement the latency-dependent application following the latency requirement. For example, based on the historical communications information, the present system can identify a few "high-latency" areas in the work site, where an average latency of on-site communication is more than "30" seconds. In such case, the present system can instruct a machine installed with the latency-dependent application to avoid entering into these high-latency areas.

In some embodiments, the present system can generate a set of instructions implementing the latency-dependent application, once a machine installed with the latency-dependent application enters a high-latency area. For example, the present system can first suspend implementing the latency-dependent application and then restore implementing it once it is confirmed that the machine has moved out of the high-latency area. As another example, the present system can generate a particular set of instructions for the latency-dependent application to be implemented in the high-latency area, such as instructing the latency-dependent application to use alternative way to communicate (e.g., seeking signals from another cellular carrier, satellite signals, Wi-Fi signals, etc.). By this arrangement, the present system can effectively and efficiently manage implementing latency-dependent applications in high-latency areas.

One aspect of the present technology includes providing an integrated user interface that enables a server or an operator to effectively manage multiple machines that have latency-dependent applications installed. The integrated user interface can include different sections indicating various types of historical communications information (e.g., low signal events and their durations and frequencies), the analysis of the historical communications information (e.g., an average signal strength, a heat map, etc.), as well as associated geographical information (e.g., a map). The integrated user interface also enables an operator to input a signal strength threshold such that a customized visual presentation can be created. Embodiments of the integrated user interface are discussed in detail with reference to FIG. 3 and FIG. 4.

FIG. 1 is a schematic diagram illustrating a system 100 in accordance with embodiments of the present technology. The system 100 includes a server 101 configured to manage on-site communications of multiple machines 103 (machines 103a, 103b, 103c, and 103d are shown in FIG. 1 as an example) in a site 10. The site 10 includes a first area 12 and a second area 14. The machines 103a-d are configured to move in the site 10 between the first area 12 and the second area 14, back and forth.

The site 10 also includes a few high-latency areas (areas HLA 1 and HLA 2 are shown in FIG. 1 as an example). In the high-latency areas HLA 1, HLA 2, the communication quality (e.g., considering factors such as speed, signal strength, intermittence, interruption, etc.) is lower than the other areas in the site 10. For example, the machines 103 are not able to communicate with the server 101 in the high-latency areas HLA 1, HLA 2 in a timely fashion. In some embodiments, the location and dimension of the high-latency areas HLA 1, HLA 2 can change (e.g., be updated) from time to time.

The server 101 communicates with the machines 103a-d via a wireless connection. The server 101 coordinates the operations of the machines 103a-d in the site 10 (e.g., picking up an object in first area 12, moving in the site 10, dropping the object in the second area 14, etc.).

The machines 103a-d include at least one latency-dependent application installed thereon. The server 101 is also configured to manage the implementation of the latency-dependent application installed on the machines 103a-d. To properly implement the latency-dependent application, the machines 103a-d are expected to continuously, or in a low-latency manner, communicate with the server 101.

In the illustrated embodiment in FIG. 1, the machine 103a is moving toward the first area 12. The machine 103b is moving toward the second area 14. The machine 103c is moving around to avoid entering into the high-latency areas HLA 1. The machine 103d is moving to leave the high-latency areas HLA 2. The latency-dependent applications installed on the machines 103a, 103b, and 103c are implemented under a "normal mode" since the machines 103a, 103b, and 103c are not in the high-latency areas HLA 1, HLA 2. In some embodiments, when detecting that the machine 103c approaches the high-latency area HLA 1, the server 101 can instruct the machine 103c to detour so as to avoid entering the high-latency area HLA 1.

The latency-dependent application of the machine 103d is implemented under an "abnormal mode" or can be suspended from implementing since the machine 103d is in the high-latency area HLA 2. When the latency-dependent application is implemented under the abnormal mode, certain functions of the latency-dependent application can be restrained or disabled.

The high-latency areas HLA 1, HLA 2 can be identified or determined by the server 101, based on historical communications information associated with the site 10. In some embodiment, the historical communications information can include "bad-connection" events happened in the site 10 in the past. In some embodiments, the historical communications information can be obtained from a public database, a research institute, or a communications service provider. In some embodiment, the server 101 can collect, generate, store, and update the historical communications information.

In some embodiments, the "bad-connection" events can be an interruption lasting 5 to 90 seconds, a sudden drop of signal strength, an unexpected loss of signal, intermittent transmission, etc. Once the "bad-connection" events are identified, corresponding information such as a duration and frequency thereof, is also recorded and analyzed by the server 101.

Different types of latency-dependent applications can have different latency requirements. For example, a first-type latency-dependent application can have a first latency requirement of "less than 5 seconds," whereas a second-type latency-dependent application can have a second latency requirement of "less than 30 seconds." The server 101 considers the latency requirement of the latency-dependent application when analyzing the bad-connection events. Based on the result of the analysis, the server 101 can instruct the machines 103 whether and/or how to implement the latency-dependent applications accordingly.

Figure 2:
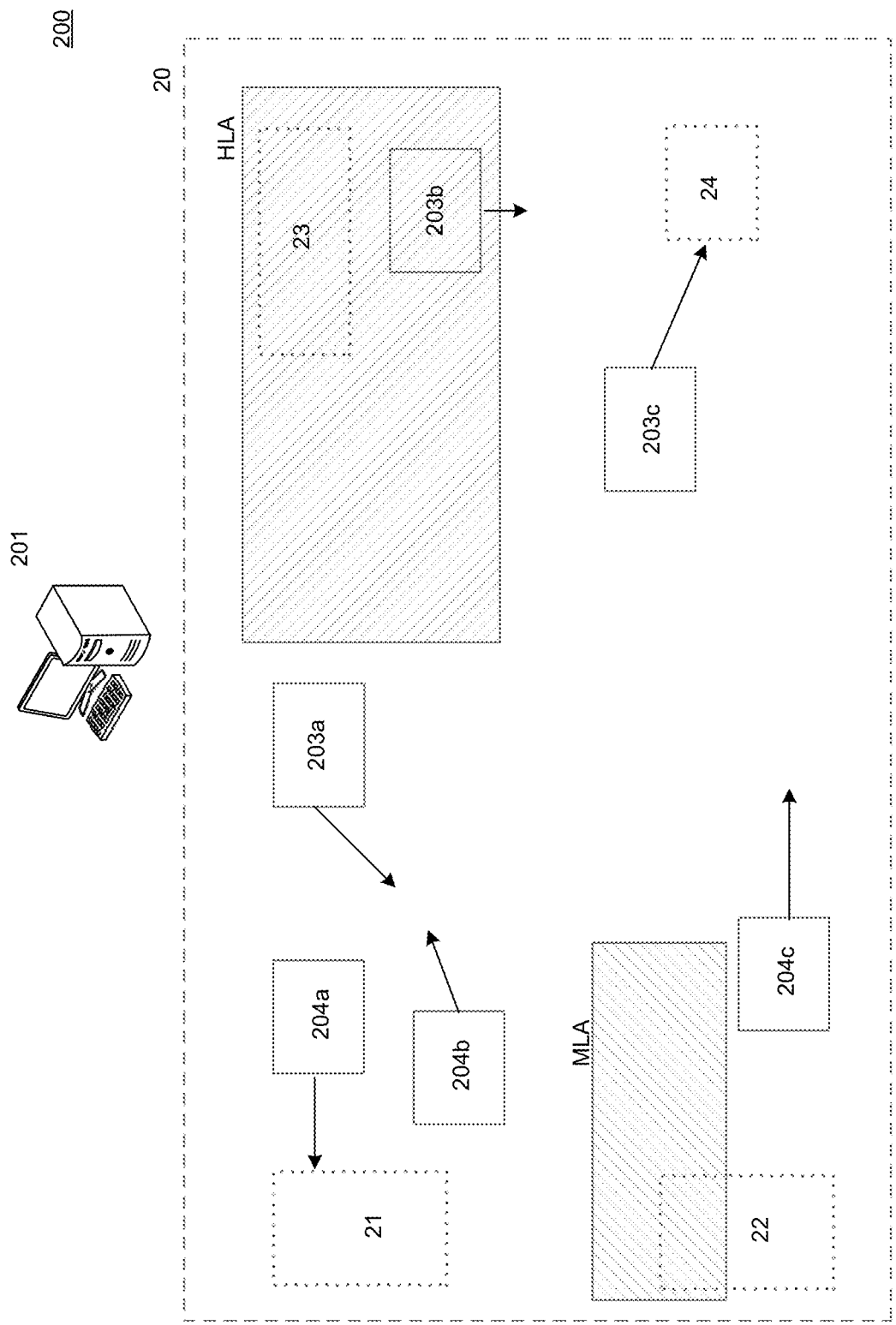
FIG. 2 is a schematic diagram illustrating another system in accordance with embodiments of the present technology.

FIG. 2 is a schematic diagram illustrating another system 200 in accordance with embodiments of the present technology. The system 200 includes a server 201 configured to manage on-site communications of multiple trucks 203 (trucks 203a, 203b, and 203c are shown in FIG. 2 as an example) and multiple loaders 204 (loaders 204a, 204b, and 204c are shown in FIG. 2 as an example) in a work site 20. The work site 20 includes a first mining area 21 and a second mining area 22. The work site 20 also includes a first target area 23 and a second target area 24. The loaders 204a-c are configured to pick up materials from the first mining area 21 or the second mining area 22, and then load the materials the trucks 203a-c. The trucks 203a-c are configured to move from the loaders 204a-c and drop the materials in the first target area 23 or the second target area 24.

The work site 20 includes a high-latency area HLA and a medium-latency area MLA. In the medium-latency area MLA, the communication quality is lower than the other areas in the work site 20. The communication quality in the high-latency area HLA is even worse than it in the medium-latency area MLA. As shown, the first target area is within the high-latency area HLA, and a portion of the second mining area 22 is in the medium-latency area MLA. The server 201 communicates with the loaders 204a-c and the trucks 203a-c via a wireless connection. The server 201 coordinates the operations the loaders 204a-c and the trucks 203a-c in the work site 20.

The loaders 204a-c and the trucks 203a-c include at least one latency-dependent application installed thereon. The server 201 is also configured to manage the implementation of the latency-dependent application. To properly implement the latency-dependent application, the loaders 204a-c and the trucks 203a-c are expected to continuously, or in a low-latency manner, communicate with the server 201.

In the illustrated embodiment in FIG. 2, the loader 204a is moving toward the first mining area 21. The loader 204b is moving away from the first mining area 21, expecting to meet the truck 203a. The loader 204c is moving away from the second mining area 22, avoiding entering into the medium-latency area MLA. The truck 203a is moving toward the loader 204b and expecting to receive materials therefrom. The truck 203b is still in the high-latency area HLA and trying to move out of the high-latency area HLA as soon as possible. The truck 203c is moving to the second target area 24. The latency-dependent applications installed on the loaders 204a-c and the trucks 203a and 203c can be implemented under a "normal mode."

The latency-dependent application of the machine 203b is implemented under an "abnormal mode" or can be suspended from implementing since the truck 203b is in the high-latency area HLA. When the latency-dependent application is implemented under the abnormal mode, certain functions of the latency-dependent application can be restrained or disabled.

The high-latency area HLA and the medium-latency area MLA can be identified or determined by the server 201, based on historical communications information associated with the work site 20. In some embodiment, the historical communications information can include past events happened in the work site 20. In some embodiments, the historical communications information can be obtained from a public database, a research institute, or a communications service provider. In some embodiment, the server 201 can collect, generate, store, and update the historical communications information.

In some embodiments, the past events can be a service interruption, low signal strength, loss of signal, intermittent transmission, etc. Once the past events are identified, corresponding information such as a duration and frequency thereof, can be recorded and analyzed by the server 201.

Different types of latency-dependent applications can have different latency requirements. The server 201 can analyze the past events based on the latency requirements. Based on the result of the analysis, the server 201 can instruct the loaders 204a-c and trucks 203a-c whether and/or how to implement the latency-dependent applications thereon.

Figure 3:
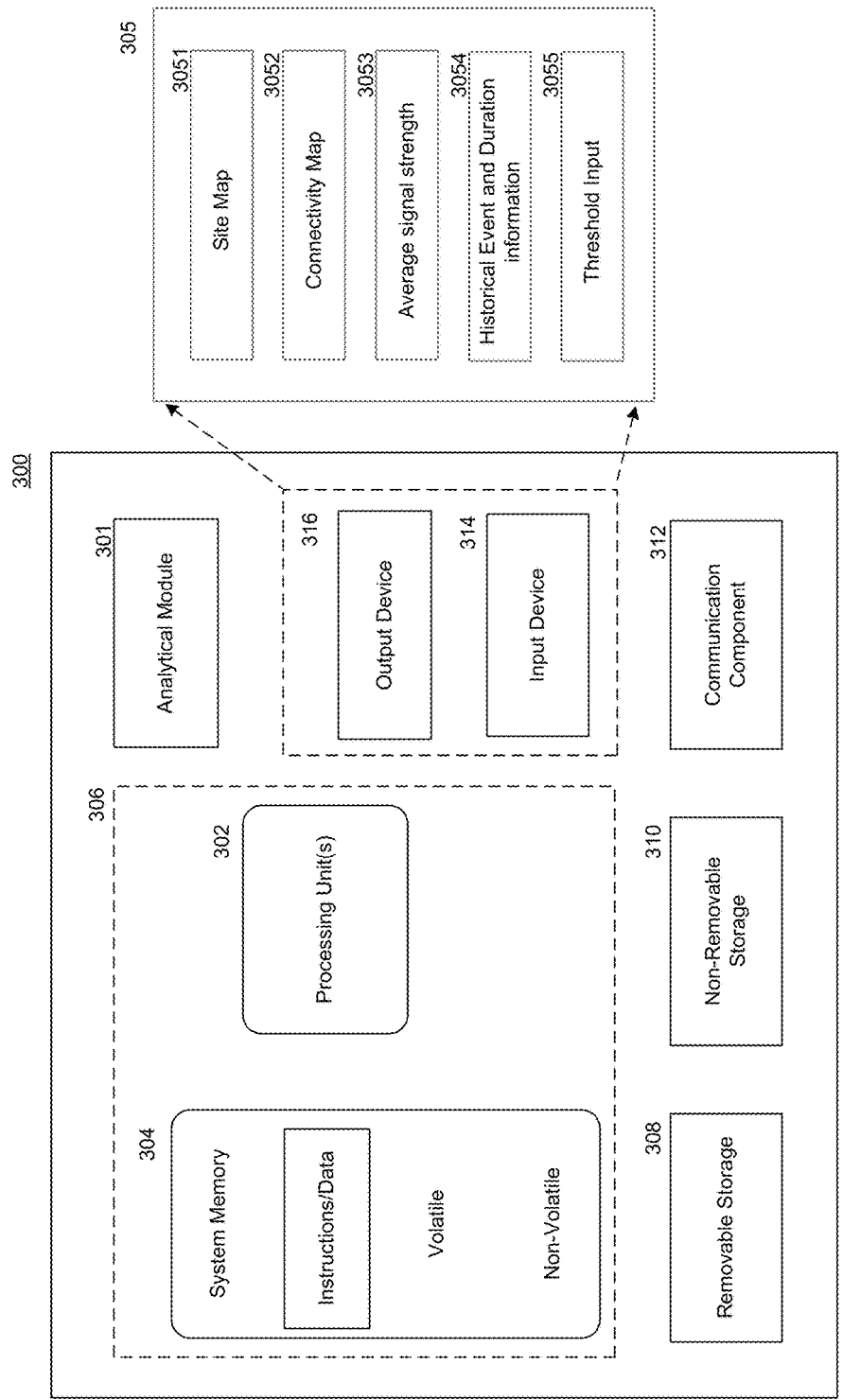
FIG. 3 is a schematic diagram illustrating components in a computing device (e.g., a server) and an example of an integrated user interface in accordance with embodiments of the present technology.

FIG. 3 is a schematic diagram illustrating components in a computing device 300 in accordance with embodiments of the present technology. An example of an integrated user interface 305 is also provided therein. The computing device 300 can be implemented as a server (e.g., the server 101 or 201 discussed herein). The computing device 300 is configured to process the methods (e.g., FIGS. 5 and 6) discussed herein. Note the computing device 300 is only an example of a suitable computing device and is not intended to suggest any limitation as to the scope of use or functionality. Other well-known computing systems, environments, and/or configurations that may be suitable for use include, but are not limited to, personal computers (PCs), server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, the computing device 300 includes at least one processing unit 302 and a memory 304. Depending on the exact configuration and the type of computing device, the memory 504 may be volatile (such as RAM), non-volatile (such as ROM, flash memory, etc.), or some combination of the two. This most basic configuration is illustrated in FIG. 3 by dashed line 306. Further, the computing device 300 may also include storage devices (a removable storage 508 and/or a non-removable storage 310) including, but not limited to, magnetic or optical disks or tape. Similarly, the computing device 300 can have an input device 314 such as keyboard, mouse, pen, voice input, etc. and/or an output device 316 such as a display, speakers, printer, etc. Also included in the computing device 300 can be one or more communication components 312, such as components for connecting via LAN, WAN, point to point, any other suitable interface, etc.

The computing device 300 can include an analytical module 301 configured to implement methods for managing a latency-dependent application installed on a machine. The analytical module 30 is configured to received and analyze historical communications information associated a site where the machine is located. In some embodiments, the analytical module 301 can be in form of instructions, software, firmware, as well as a tangible device.

In some embodiments, the output device 316 and the input device 314 can be implemented as the integrated user interface 305. The integrated user interface 305 is configured to visually present historical communications information and geographical information discussed herein. The integrated user interface 305 is also configured to receive an input regarding how a user would like to analyze the historical communications information. As shown, the integrated user interface 305 can include sections for indicating a site map 3051, a connectivity map 3052 (e.g., a signal-strength heat map), an average signal strength 3053, historical event and duration information 3054, and a threshold input 3055. Embodiments of the integrated user interface 305 are discussed in detail with reference to FIG. 4.

The computing device 300 includes at least some form of computer readable media. The computer readable media can be any available media that can be accessed by the processing unit 302. By way of example, the computer readable media can include computer storage media and communication media. The computer storage media can include volatile and nonvolatile, removable and non-removable media (e.g., removable storage 308 and non-removable storage 310) implemented in any method or technology for storage of information such as computer readable instructions, data structures, program modules or other data. The computer storage media can include, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

The communication media can include non-transitory computer readable instructions, data structures, program modules, or other data. The computer readable instructions can be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, the communication media can include wired media such as a wired network or direct-wired connection, and wireless media such as acoustic, radio frequency (RF), infrared and other wireless media. Combinations of the any of the above should also be included within the scope of the computer readable media.

The computing device 300 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

Figure 4:
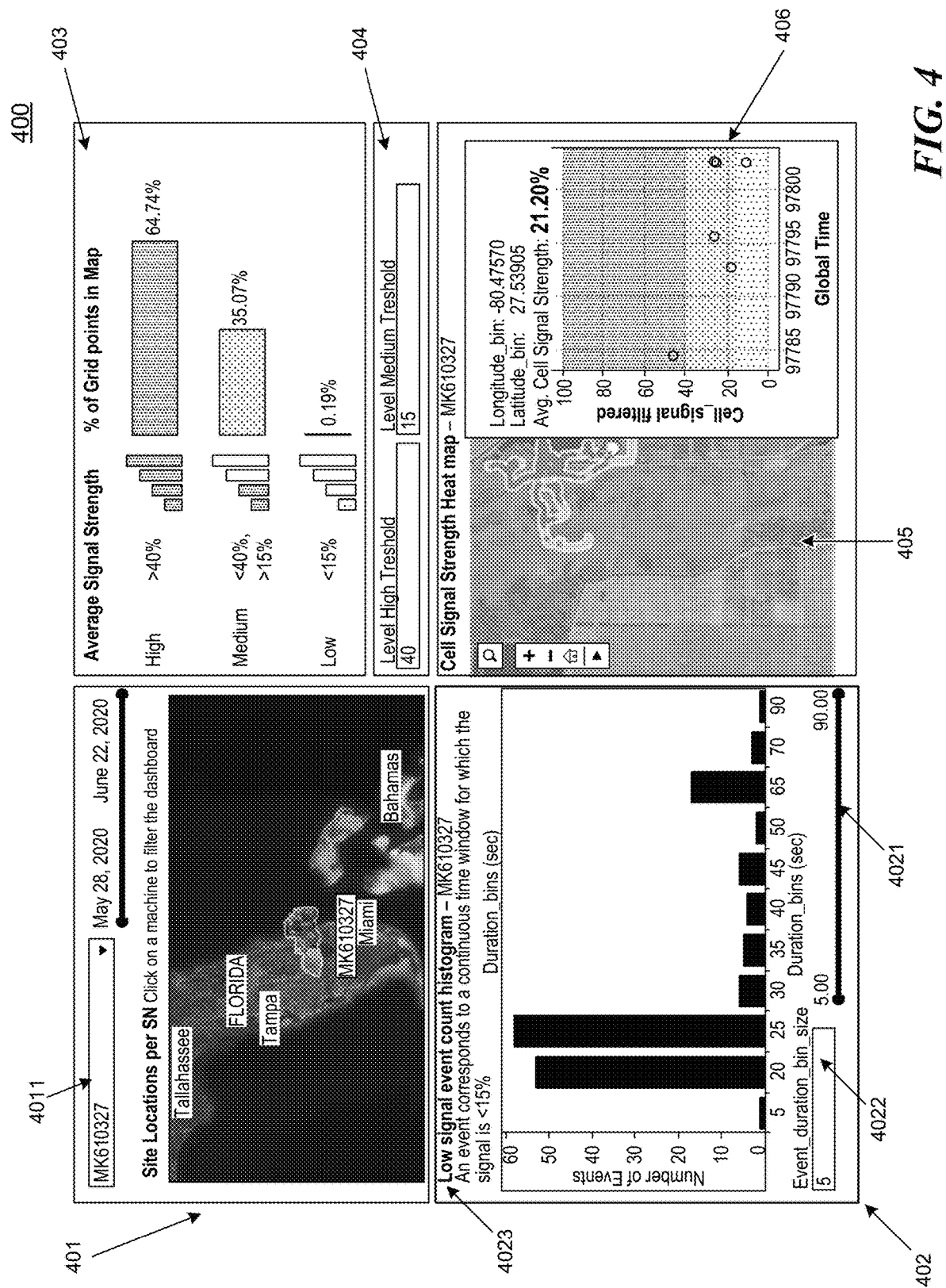
FIG. 4 is a schematic diagram of an integrated user interface in accordance with embodiments of the present technology.

FIG. 4 is a schematic diagram of an integrated user interface 400 in accordance with embodiments of the present technology. The integrated user interface 400 is configured to visually present historical communications information and geographical information of a work site. The integrated user interface 400 also enables a user or an operator to customize how to analyze and visually present the historical communications information, such that the user or the operator can efficiently manage the implementation of latency-dependent applications installed in one or more machines in the work site.

As shown, the integrated user interface 400 includes a first area 401 for indicating the geographical information. In the first area 401, the location of the work site can be shown on a map. Machine "MK 610327" of the multiple machines can be selected at box 4011. A time sliding bar 4012 enables the user to select a desirable time period to visually present available data points in the integrated user interface 400.

The integrated user interface 400 also includes a second area 402 for indicating the historical communications information associated with the selected machine "MK 610327." A duration sliding bar 4021 enables the user to adjust the range of the time duration to be displayed. A bin-size box 4022 enables the user to select suitable time period for displaying. As shown in the second area 402, the definition of a "low signal" event is also shown at an upper portion 4023 of the second area 402. In some embodiments, the definition of the "low signal" event can be altered by the user.

The integrated user interface 400 also includes a third area 403 for indicating an average signal strength. The average signal strength can be determined based on analyzing data points or grid point in a grid of the work site. As shown, "67.74%" of the data points associated with the machine "MK 610327" is considered "high strength" (e.g., "4 out of 4" signal bar, or more than 40% of a strength scale), "35.07%" of the data points associated with the machine "MK 610327" is considered "medium strength" (e.g., "2 out of 4" signal bar, or 15-40% of the strength scale), and "0.19%" of the data points associated with the machine "MK 610327" is considered "low strength" (e.g., "1 out of 4" signal bar, or less than 15% of the strength scale).

In some embodiments, the average signal strength can be determined based on the data points associated with the multiple machines. For example, assuming that, in the past month, there have been 100 machines (including 30 loaders and 70 truckers) operating in a work area. There can be various ways to calculate the average signal strength. In some embodiments, the average signal strength can be determined only based on data points associated with a single type of machines. For example, the average signal strength for the 30 loaders and the average signal strength for the 70 truckers can be respectively calculated. In other embodiments, the average signal strength can be calculated based on the data points of a portion of the multiple machines.

In a fourth area 404, the user can input desirable signal strength percentage thresholds for determining the average signal strength. In the illustrated embodiment, "Level-High" threshold is set as "40%," and "Level-Medium" threshold is set as "15%." The average signal strength thresholds can be determined based on user preference, empirical data, the type of a latency-dependent application to be used and its latency requirement, any other suitable factors, etc. In some instances, there can only one average signal strength threshold. In other cases, there can be more than two average signal strength thresholds.

The data points of a grid used for calculating the average signal strength thresholds can be in various types of forms. In some embodiments, the data points can include temporal or time-related data showing signal strength over time. In other embodiments, the data points can include discrete values indicating signal strength in various locations of the grid. In some embodiments, the data points can include an aggregated value that is a combination of multiple data points (e.g., data points located near a mountain in the grid). In some embodiments, the data points can include values received from other devices or machines, such as data collected by a mobile device (e.g., a mobile phone, a tablet, a notebook, vehicles driven on a road, etc.) in the grid. In some embodiments, the data points can include values reported by a network carrier (e.g., a telecommunication service provider, a mobile-device company, etc.).

The average signal strength thresholds can be represented in various forms. In the illustrated embodiments shown in FIG. 4, the average signal strength thresholds are in form of percentage values. In other embodiments, however, the average signal strength thresholds can be a discrete number (e.g., an integer or real number) indicating the signal strength (e.g., a scale of "1-10," "10-100," etc.).

In some embodiments, the average signal strength thresholds can be a logical comparator generated based on a comparison or an analysis. For example, the logical comparator can be "10%" which means that the signal strength is "10%" better than is received across one or more work sites. As another example, the logical comparator can be "machine-specific" and/or "device-specific," which means only a particular type of machines (e.g., "loader-specific" or "truck-specific") or devices (e.g., devices in a specific carrier's network) are considered.

In the illustrated embodiment, the integrated user interface can include a fifth area 405 indicating a heat map of the average signal strength. The integrated user interface can further include a sixth area 406, indicating an analysis of the duration of the communications event and the frequency of the communications event, for a particular grid as selected in the fifth area 405.

Figure 5:
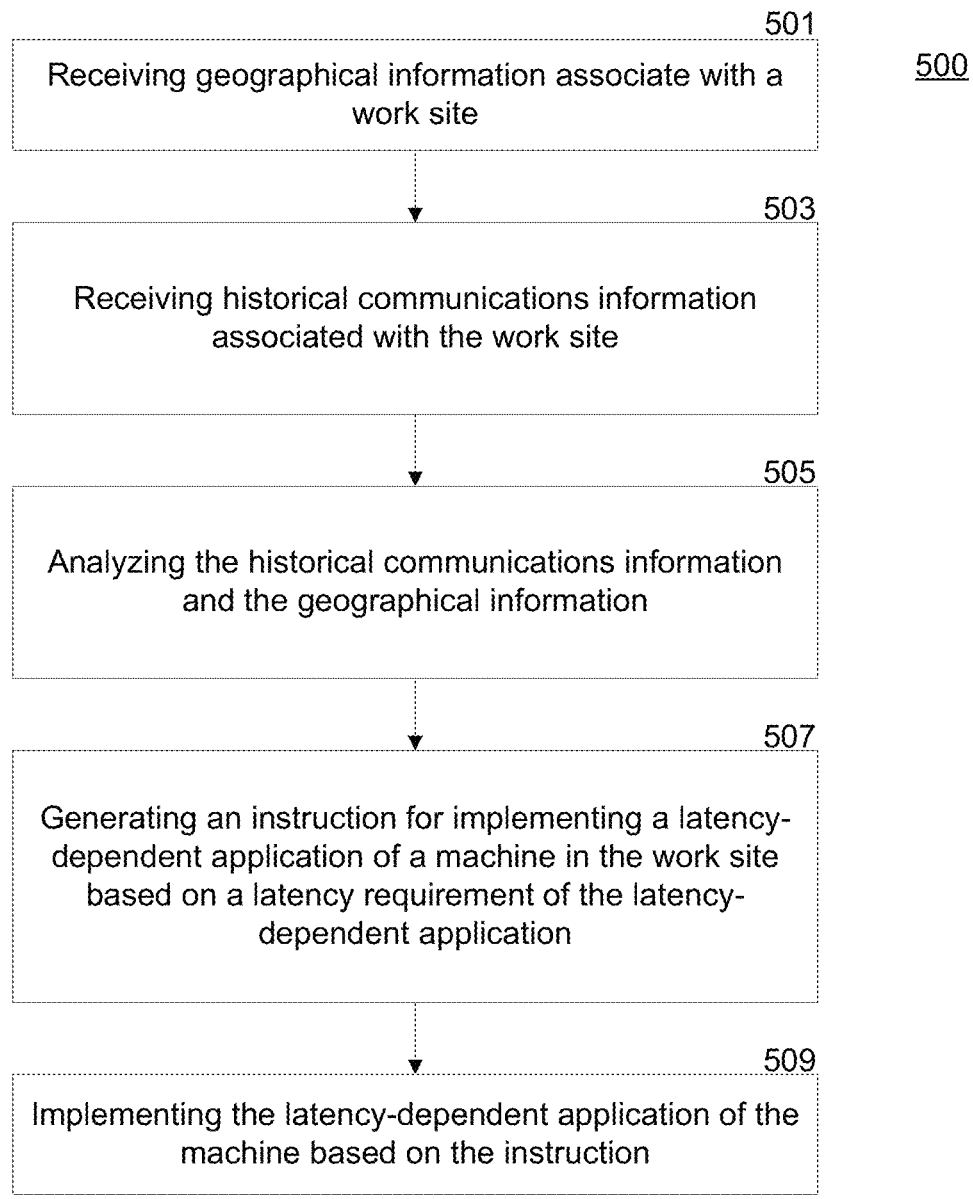
FIG. 5 is a flow diagram showing a method in accordance with embodiments of the present technology.

FIG. 5 is a flow diagram showing a method 500 for managing a machine with a latency-dependent application installed in accordance with embodiments of the present technology. The method 500 can be implemented by a server (e.g., the server 101 or 201), a computing device (e.g., the computing device 300), and/or any other suitable devices. In some embodiments, the method 500 can also include steps that can be implemented by a machine (e.g., the machine 103, the truck 203, or the loader 204).

The method 500 starts at block 501 by receiving geographical information associated with a work site. In some embodiments, the geographical information can include a map, coordinate information, longitudinal and latitudinal information, altitudinal information, etc. Step 501 can be implemented by the server. In some embodiments, the machine can also receive the geographical information associated with the work site. In some embodiments, the machine can pull/download and install a latency-dependent application from the server. The server is to instruct the machine whether and how to implement the latency-dependent application.

At block 503, the method 500 continues by receiving historical communications information associated with the work site. In some embodiments, the historical communications information can include a communications event, a duration of the communications event, and a frequency of the communications event. In some embodiments, the historical communications information is associated with one or more machines, devices, or vehicles. In some embodiments, the machine can also receive at least a portion of the historical communications information associated with the work site from the server. That way the machine can have a local copy of the historical communications information for reference when implementing the latency-dependent application.

At block 505, the method 500 continues by analyzing the historical communications information and the geographical information. In some embodiments, the analysis can be performed for a specific machine (e.g., machine "MK 610327" shown in FIG. 4). In some embodiments, the analysis can be performed for multiple machines (embodiments discussed with reference to FIGS. 1 and 2).

At block 507, the method 500 continues by generating an instruction for implementing the latency-dependent application of the machine based on a latency requirement of the latency-dependent application. In some embodiments, the latency requirement can vary for different types of latency-dependent applications. For example, the latency requirement can be "less than 5 seconds," "less than 30 seconds," or "less than 10 minutes."

In some embodiments, the communications event can be a network latency higher than a threshold time determined based on a latency requirement of the latency-dependent application. In some embodiments, the duration of the communications event can include an actual duration and an average duration. In some embodiments, the frequency of the communications event can include a number of times that the communications event has happened during a time period in the past.

In some embodiments, the method 500 can further comprising receiving real-time communications information associated with the work site, and generating the instruction based on the real-time communications information. For example, the "real time" communications information can be a real-time signal strength. If the real-time signal strength is available, the server can also use such information to generate the instruction for implementing the latency-dependent application. For example, even though a machine is in a high latency area (e.g., determined based on historical communications information), if real-time signal strength information show that the current signal is strong, the server can still instruction the machine to implement the latency-dependent application in a normal mode.

At block 509, the method 500 includes implementing the latency-dependent application of the machine based on the instruction. In some embodiments, the server can transmit the instruction to the machine to enable/authorize the machine to implement the latency-dependent application, as well as how to implement the latency-dependent application (e.g., to perform all available functions or merely a portion thereof).

Figure 6:
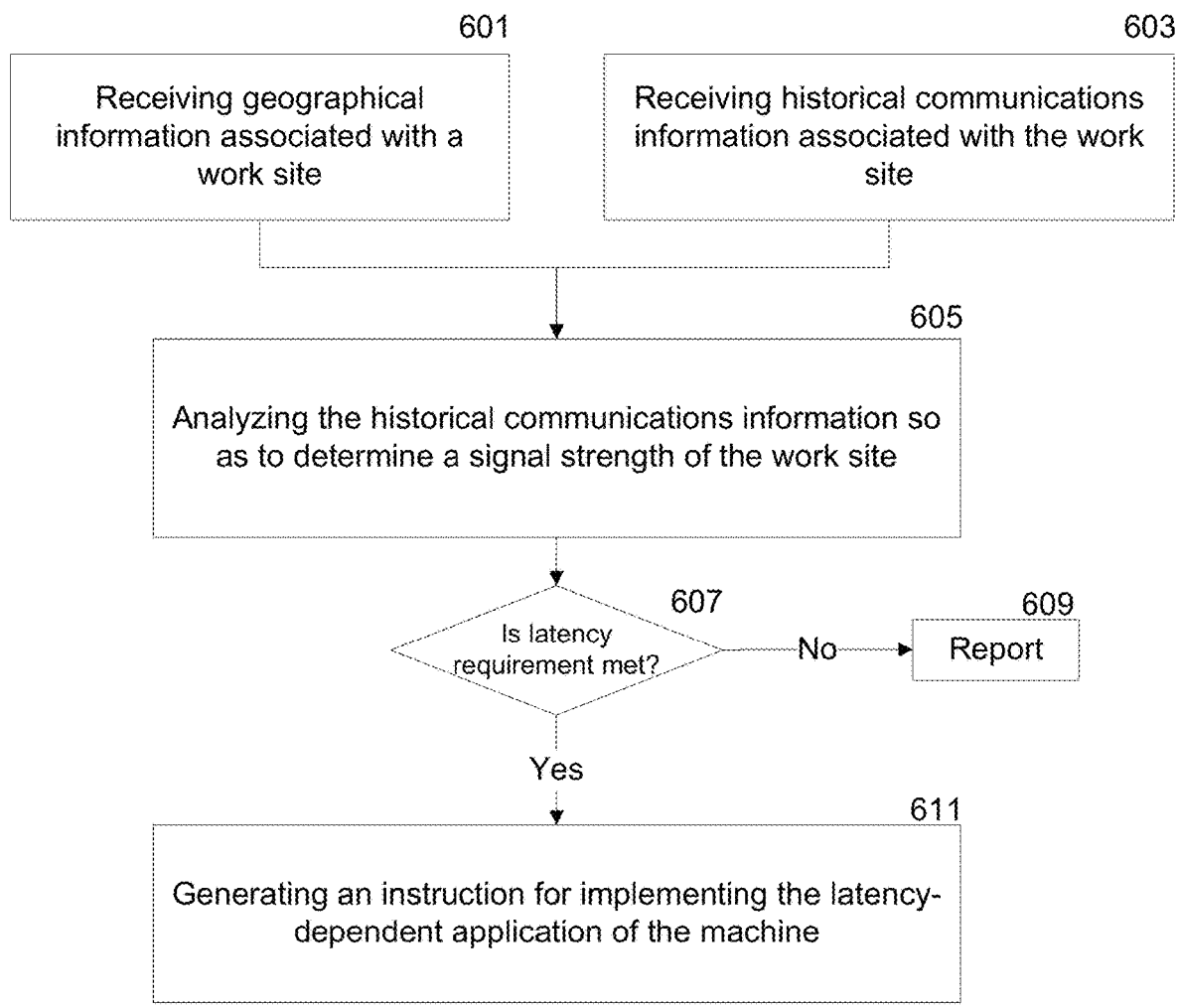
FIG. 6 is a flow diagram showing a method in accordance with embodiments of the present technology.

FIG. 6 is a flow diagram showing a method 600 for assessing a communications quality for a latency-dependent application installed in a machine. The method 600 can be implemented by a server (e.g., the server 101 or 201), a computing device (e.g., the computing device 300), and/or any other suitable devices. In some embodiments, the method 600 can also include steps that can be implemented by a machine (e.g., the machine 103, the truck 203, or the loader 204).

At block 601, the method 600 starts by receiving geographical information associated with a work site. In some embodiments, the geographical information can include a map, coordinate information, longitudinal and latitudinal information, altitudinal information, etc. Step 601 can be implemented by the server. In some embodiments, the machine can also receive the geographical information associated with the work site. In another embodiment, the server can also receive a location of the machine. In some embodiments, the machine can pull/download and install a latency-dependent application form the server. The server is to instruct the machine whether and how to implement the latency-dependent application.

In a parallel step, at block 603, the method 600 includes receiving historical communications information associated with the work site. In the illustrated embodiment, the historical communications information is associated with the same work site as described in step 601. In some embodiments, however, the historical communications information associated with the work side can further include information from "other" work sites similar to the work site. For example, the received historical communications information can include information of other work sites with similar geography, machinery, purposes, ownerships, etc. For example, the historical communications information can be a set of information associated with multiple work sites (including the "work site" discussed above and "other" work sites) that are owned or operated by an entity. In some embodiments, the multiple work sites can be over-lapping.

At block 605, the method 600 continues by analyzing the historical communications information so as to determine a signal strength of the work site. For example, the signal strength can be a signal strength threshold in a grid (e.g., the grid where the machine is located) of the work site. In some embodiments, the historical communications information can be analyzed with the geographical information by the server.

For example, an analysis of the time that a machine spends within different parts of the work site or other similar work sites can be performed. In another example, an analysis of multiple the same or different types of machines can be performed. In some embodiments, the server can further analyze whether the geography of the work site has changed. In some embodiments, the server can identify a changed landscape in the work site. For example, the changed landscape now prevents the communications that were historically accessible. As another example, the changed landscape now makes accessible the communications that were historically inaccessible.

At decision block 607, the method 600 determines whether a latency requirement of the latency-dependent application is met by comparing the latency requirement with an analyzed signal strength value (e.g., a percentage, a strength indicator, or other suitable strength scale values).

The latency requirement specify temporal requirements or restrictions for implementing the latency-dependent application. Examples of the latency requirement includes "real-time," "quasi real-time," "less than 1 second," "less than 5 seconds," "less than 10 seconds," "less than 30 seconds," and so on.

The latency requirement can vary for different types of latency-dependent applications. For example, a latency-dependent application that handles machine safety (e.g., monitoring statuses thereof and generating alarms accordingly) may require a "real-time" latency. A latency-dependent application that coordinate assigned tasks among multiple machines can have a latency requirement of "less than 2 minutes."

The signal strength determined in step 605 can be indicative of an expected latency when implementing the latency-dependent application. For example, when the signal strength is "strong," it means that the expected latency is less than "1 second." Similarly, if the signal strength is "medium," it means that the expected latency is in a range of "1 to 30 seconds," whereas if the signal strength is "weak" means that the expected latency is more than "30 seconds."

If the expected latency is less than the latency requirement, it is determined that the latency requirement is met, and the process goes to block 611. At block 611, an instruction for implementing the latency-dependent application of the machine is generated. In cases where the latency-dependent application has been installed (or registered) in the machine, the server can transmit the instruction to the machine to enable/authorize the machine to implement the latency-dependent application. The instruction can also include how to implement the latency-dependent application such as performing all available functions or merely a portion thereof. In cases where the latency-dependent application has not been installed (or registered) in the machine, the server can enable the machine to download the latency-dependent application (e.g., from the server or other sources) and then implementing the latency-dependent in the same manner as discussed above.

If the expected latency is less than the latency requirement, it is determined that the latency requirement is not met. The process moves to block 609 and generates a report (e.g., not to instruct the machine to implement the latency-dependent application). In some embodiments, the report can include a reason specifying why the latency requirement is not met (e.g., due to "geography" of a location, lack of adjacent base stations, etc.) for future improvement and analysis.

INDUSTRIAL APPLICABILITY

The systems and methods described herein can manage a machine with a latency-dependent application installed. The systems analyze receiving historical communications information (e.g., past communications events and their durations and frequencies) and geographical information in a work site so as to determine whether and/or how to implement the latency-dependent application. In operation, the analyses can be visually presented to a user or an operator such that he/she can efficiently manage multiple machines with the latency-dependent application installed. It is particularly advantageous for an operator or a server that manages or monitors a group of machines with different sets of latency-dependent application installed. The present systems and methods can be implemented to manage, monitor, and communicate with multiple industrial machines, vehicles and/or other suitable devices such as mining machines, trucks, corporate fleets, etc.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for managing a machine with a latency-dependent application installed, the method comprising:
   receiving geographical information associated with a work site;
   receiving historical communications information associated with the work site, wherein the historical communications information includes a communications event, a duration of the communications event, and a frequency of the communications event; and
   analyzing the historical communications information and the geographical information;
   generating an instruction for implementing the latency-dependent application of the machine based on a latency requirement of the latency-dependent application, wherein the latency requirement includes a time duration requirement for implementing the latency-dependent application during the communications event; and
   implementing the latency-dependent application of the machine based on the instruction.

2. The method of claim 1, wherein the communications event includes a network latency higher than a threshold time determined based on the latency requirement.

3. The method of claim 1, wherein the duration of the communications event includes an actual duration and an average duration.

4. The method of claim 1, wherein the frequency of the communications event includes a number of times that the communications event has happened during a time period.

5. The method of claim 1, further comprising
receiving real-time communications information associated with the work site; and
generating the instruction based on the real-time communications information.

6. The method of claim 1, further comprising
generating an integrated user interface having a first area for indicating the geographical information and a second area for indicating the historical communications information.

7. The method of claim 6, wherein the integrated user interface includes a third area for indicating an average signal strength.

8. The method of claim 7, wherein the average signal strength is determined based on grid points in a grid of the work site.

9. The method of claim 8, wherein the signal strength percentage threshold includes a first percentage threshold and a second percentage threshold.

10. The method of claim 9, wherein the first percentage threshold ranges from 50 to 30 percent.

11. The method of claim 9, wherein the second percentage threshold ranges from 25 to 5 percent.

12. The method of claim 7, wherein the integrated user interface includes a fourth area for receiving an input of a signal strength threshold for determining the average signal strength.

13. The method of claim 7, wherein the integrated user interface includes a fifth area indicating a heat map of the average signal strength.

14. The method of claim 13, wherein the integrated user interface includes a sixth area indicating an analysis of the duration of the communications event and the frequency of the communications event.

15. A system, comprising:
a processor; and
a memory communicably coupled to the one processor, the memory comprising computer executable instructions, when executed by the processor, to:
receive geographical information associated with a work site;
receive historical communications information associated with the work site, wherein the historical communications information includes a communications event, a duration of the communications event, and a frequency of the communications event;
analyze the historical communications information and the geographical information;
generate an instruction for implementing a latency-dependent application installed on a machine based on a latency requirement of the latency-dependent application, wherein the latency requirement includes a time duration requirement for implementing the latency-dependent application during the communications event; and
implementing the latency-dependent application of the machine.

16. The system of claim 15, wherein the computer executable instructions are, when executed by the processor, to:
generate an integrated user interface having a first area for indicating the geographical information and a second area for indicating the historical communications information.

17. The system of claim 16, wherein the integrated user interface includes a third area for indicating an average signal strength, and wherein the average signal strength is determined based on whether a percentage of grid points in a grid of the work site exceeds a signal strength percentage threshold.

18. The system of claim 15, wherein the computer executable instructions are, when executed by the processor, to:
receive real-time communications information associated with the work side; and
generate the instruction based on the real-time communications information.

19. A method for accessing a communications quality for a latency-dependent application installed in a machine, the method comprising:
receiving historical communications information associated with a work site, wherein the historical communications information includes a communications event, a duration of the communications event, and a frequency of the communications event; and
analyzing the historical communications information so as to determine a signal strength value in a grid of the work site;
determine whether to implement the latency-dependent application based on the signal strength threshold and a latency requirement, wherein the latency requirement includes a time duration requirement for implementing the latency-dependent application during the communications event.

20. The method of claim 19, wherein the signal strength percentage threshold includes a level-high percentage threshold and a level-medium percentage threshold.

* * * * *